(12) United States Patent
Joslin et al.

(10) Patent No.: US 7,324,166 B1
(45) Date of Patent: Jan. 29, 2008

(54) LIVE ACTOR INTEGRATION IN PRE-RECORDED WELL KNOWN VIDEO

(75) Inventors: Robert W. Joslin, Burbank, CA (US); Christopher G. Brown, Sherman Oaks, CA (US)

(73) Assignee: Contour Entertainment Inc, Van Nuys, CA (US)

( * ) Notice: Subject to any disclaimer, the term of this patent is extended or adjusted under 35 U.S.C. 154(b) by 598 days.

(21) Appl. No.: 10/990,161

(22) Filed: Nov. 15, 2004

Related U.S. Application Data (60) Provisional application No. 60/519,922, filed on Nov. 14, 2003.

(51) Int. Cl.
*H04N 9/74* (2006.01)
*H04N 9/75* (2006.01)
*H04N 9/76* (2006.01)

(52) U.S. Cl. .................... 348/722; 348/578; 348/584; 348/586; 348/587; 715/723

(58) Field of Classification Search ............... 348/722, 348/578, 584, 586, 587, 589, 598, 600, 705, 348/14.11, 14.09, 153, 159; 382/284, 282, 382/283, 305; 715/723, 719
See application file for complete search history.

(56) References Cited

U.S. PATENT DOCUMENTS

| | | |
|---|---|---|
| 4,095,139 A | 6/1978 | Symonds et al. |
| 4,688,105 A | 8/1987 | Block et al. |
| 5,093,720 A | 3/1992 | Krause et al. |
| 5,099,337 A | 3/1992 | Cury |
| 5,175,618 A | 12/1992 | Ueda et al. |
| 5,227,863 A * | 7/1993 | Bilbrey et al. ............... 348/578 |
| 5,249,039 A | 9/1993 | Chaplin |
| 5,305,107 A | 4/1994 | Gale et al. |
| 5,345,313 A * | 9/1994 | Blank .......................... 348/598 |
| 5,400,081 A * | 3/1995 | Chaplin ....................... 348/587 |
| 5,517,236 A | 5/1996 | Sergeant et al. |
| 5,737,031 A * | 4/1998 | Tzidon et al. ............... 348/587 |
| 5,838,310 A * | 11/1998 | Uya ............................ 345/536 |
| 5,848,146 A | 12/1998 | Slattery |
| 5,852,438 A * | 12/1998 | Tomizawa et al. .......... 715/738 |
| 5,872,565 A * | 2/1999 | Greaves et al. ............. 715/723 |
| 5,886,747 A * | 3/1999 | Tzidon et al. ............... 348/587 |
| 5,986,717 A * | 11/1999 | Fairhurst ..................... 348/584 |
| 5,986,718 A * | 11/1999 | Barwacz et al. ............ 348/592 |
| 6,141,063 A * | 10/2000 | Gehrmann ................... 348/592 |
| 6,144,366 A * | 11/2000 | Numazaki et al. .......... 345/156 |
| 6,154,600 A * | 11/2000 | Newman et al. ............... 386/4 |
| 6,204,840 B1 * | 3/2001 | Petelycky et al. ........ 715/500.1 |

(Continued)

*Primary Examiner*—David Ometz
*Assistant Examiner*—Jean W. Désir
(74) *Attorney, Agent, or Firm*—Robert W. J. Usher (57) ABSTRACT

The apparatus inserts a participant realistically into familiar background media to provide similar results to a completely original movie with multi-camera studio production and editing. An automated and simplified studio has multiple cameras and traditional studio devices such as teleprompters and controlled lighting presented to the consumer as an entertainment product. Previously produced, familiar media are modified to create the background video source and synchronous audio track. The participant is inserted via chroma key and the multiple cameras are used to create traditional establishing shots intercut with close-ups. These are controlled through a video switcher to create a real-time, finished recording that is stored on a digital server for later playback.

7 Claims, 9 Drawing Sheets

U.S. PATENT DOCUMENTS

| | | | |
|---|---|---|---|
| 6,266,100 B1 * | 7/2001 | Gloudemans et al. | 348/587 |
| 6,278,448 B1 * | 8/2001 | Brown et al. | 715/866 |
| 6,301,382 B1 * | 10/2001 | Smith et al. | 382/162 |
| 6,320,624 B1 * | 11/2001 | Ayer et al. | 348/584 |
| 6,351,765 B1 * | 2/2002 | Pietropaolo et al. | 709/218 |
| 6,353,461 B1 * | 3/2002 | Shore et al. | 348/722 |
| 6,452,612 B1 * | 9/2002 | Holtz et al. | 715/723 |
| 6,454,415 B1 * | 9/2002 | Vlahos | 353/30 |
| 6,456,300 B1 * | 9/2002 | Pettigrew | 345/634 |
| 6,460,018 B1 * | 10/2002 | Kasai et al. | 705/8 |
| 6,476,874 B1 | 11/2002 | Ito et al. | |
| 6,538,396 B1 * | 3/2003 | Vlahos et al. | 315/292 |
| 6,674,485 B2 * | 1/2004 | Akiyama et al. | 348/586 |
| 6,731,825 B1 * | 5/2004 | Acampora et al. | 382/284 |
| 6,753,929 B1 * | 6/2004 | Sheraizin et al. | 348/586 |
| 6,909,438 B1 * | 6/2005 | White et al. | 345/629 |
| 6,919,892 B1 * | 7/2005 | Cheiky et al. | 345/473 |
| 7,024,677 B1 * | 4/2006 | Snyder et al. | 725/86 |
| 7,034,886 B2 * | 4/2006 | Ross et al. | 348/445 |
| 7,038,699 B2 * | 5/2006 | Sato et al. | 345/633 |
| 7,071,953 B2 * | 7/2006 | Matsuoka et al. | 345/629 |
| 7,091,993 B1 * | 8/2006 | Ahmad | 345/629 |
| 7,095,450 B1 * | 8/2006 | Holmes et al. | 348/586 |
| 7,143,434 B1 * | 11/2006 | Paek et al. | 725/142 |
| 7,164,441 B1 * | 1/2007 | Miyazaki et al. | 348/239 |
| 7,164,490 B2 * | 1/2007 | Manico et al. | 358/1.18 |
| 7,209,181 B2 * | 4/2007 | Kriegman | 348/586 |
| 7,230,653 B1 * | 6/2007 | Overton et al. | 348/584 |
| 7,236,210 B2 * | 6/2007 | Iwase | 348/584 |

* cited by examiner

| ID# | Description | Quantity | Manufacturer | Model # |
|---|---|---|---|---|
| 1 & 5 | Video Camera, 1/2" CCD w/RGB | 2 | JVC | TK1270U |
| 3 & 7 | Pan/Tilt Unit | 2 | Philips | TC6270PT |
| 2 & 6 | 8-48mm Motorized Zoom Lens | 2 | Computar | H6Z0812MP |
| 4 & 8 | Reciever Driver Unit | 2 | Philips | LTC8561 |
| 9 | Tally Lights | 5 | Y Lighting | Model 88 |
| 10 | 41 space rack, 70 in.w/rear door | 1 | Middle Atlantic | MAA-ERK-4026 |
| 11 | Interated Media Server | 1 | Granite Precision Inc. | Cont-02 |
| 12 & 13 | RGB to Serial Converter w/Framesync | 2 | AJA Video | R20AD-F |
| 14 | Production Switcher | 1 | Ross Video | S1-007 |
| 14 | Keyer/switcher serial interface port | 1 | Ross Video | S100-0060 |
| 15 & 16 | LCD Monitor 15" (teleprompter) | 2 | Innovision | Mag 565 |
| 17 | LCD Monitor 15" (OCC) | 1 | Innovision | Mag 565 |
| 18 | PS-2 Keyboard | 1 | Mitsumi | KFKEA4XT |
| 19 | PS-2 Optical Mouse | 1 | Mitsumi | ECM-S6102 |
| 20 | Dot Matix Receipt Printer (SP200 series) | 1 | Star Micronics | sp2216d42-120 |
| 21 | Cash Drawer | 1 | APG | S186-6a-CW1816 |
| 22 & 23 | Miniature Lavalier Microphone & PS | 2 | audio-technica | Pro7a |
| 24 | Audio Processor | 1 | Peavey | Digitool MX |
| 25 | Ross Component Monitoring Amp. | 1 | Ross Video | CMA-8011A |
| 26 | Recording Server | 1 | Contour Entertainment Inc. | custom |
| 27 | KVM Switch | 1 | Gefen Inc. | KS-104 |
| 29 | 32" T.V. Monitor, Audience View | 1 | JVC | AV32320 |
| 30 | 19". T.V. Mon., Guest View | 1 | Magnavox | MT1905B |
| 31 | VHS Record Deck, Serially controlled | 1 | JVC | SR-365U |
| 32 | 4" LCD Video Monitor Tape/DVD preview | 1 | Marshall | V-LCD4-Pro |
| 33 | "Quiet Please-Recording" Lightbox | 1 | Custom | custom |
| 34 | Lighting Dimmer | 1 | Leprecon | LD-360DMX |
| 35 | 6" Fresnel | 4 | Altman | 65Q |
| 36 | Nook Light | 2 | Altman | Q-Lite |
| 37 | Blue Screen (stretched on frame) | 1 | Bill Ferrell Co. | custom |
| 38 | Teleprompter Glass (18"X15") | 2 | Denglas Technologies Inc. | MLBS-30 |

LIVE ACTOR INTEGRATION IN PRE-RECORDED WELL KNOWN VIDEO

RELATED APPLICATIONS

This application claims priority from provisional application 60/519,922 filed Nov. 14, 2003, the disclosure of which is incorporated herein by reference

BACKGROUND OF THE INVENTION

Traditional editing for storytelling on film (and later video) created and perfected the style of inter-cutting shots of varying focal lengths and at varying angles to communicate the positional relation between characters in establishing shots and to provide increased intensity of performance by using close-ups. The ability to cut away from one perspective to another also allowed the use of different takes within the same production. These techniques have become so commonplace that they are inculcated and accepted by everyone with any media exposure whatsoever.

These techniques have also been used for many years in live productions with multiple cameras from the beginning of Television as Live Broadcast TV to today's news, awards, sports and talk shows.

Since the mid 1960's as the "Studio Tours" flourished in the Los Angeles area, "simulated" shows were created where participant could take the role of actors on sets with contemporary equipment and create short video scenes from famous shows. This type of "live" production has become a Theme Park staple over the years and many versions of custom media inserting guests into the previously produced segment have been created.

On a separate path, beginning more than 20 years ago, as MTV exploded onto the scene, the evolution of audio Karaoke to music video setups were taking the first steps of simplifying the production studio apparatus to bring some version of these expensive production techniques to a new market as a simplified production studio. These were all single camera set-ups and were not attempting to accomplish anything more than a superimposition of the guest over an interesting background while the music played. There was no intent of interacting with the background.

The next step in the evolution was to insert participants into a background entirely pre-produced specifically for the purpose of inserting a participant member of the public who could interact by answering questions or reading prompts to give them the appearance of appearing on a television show. In one example, this was showcased a decade ago at EPCOT center in Florida where guests could do a brief interview with Jay Leno. This setup was reprised at the Olympic Village in Atlanta in 1996 and has been resident at the NBC Experience in Rockefeller Plaza since 1999. There are other options in the later location and another example in "Studio 39" in San Francisco. However, in all of these installations, a single camera is used to place the participant into a back ground scene produced specifically and only for that purpose.

SUMMARY OF THE INVENTION

A unique aspect of the invention is the utilization of the techniques of multi-Camera production and editing in tandem with the automated studio to create a short, story-driven video where the participant portrays a character and is inserted into the video using the combination of establishing shots and close-ups. This allows a whole new version of such videos to be created.

In a specific embodiment of the invention, existing television arid film media is re-edited to create the short background media. The existing media is modified to eliminate an actor or otherwise alter the background media, thus allowing insertion of the participant into a similar position in the establishing shots. The close ups of actors within the production are re-edited along with new backgrounds to compliment the establishing shots for use in new close-ups with the patron. A new script is created to work the participant's voice into the existing dialogue. This is similar to the studio production efforts that were made in various television commercials in the 1980's and in the film "Forrest Gump" in 1994.

The present invention comprises an entertainment product that utilizes multiple cameras with motion and zoom capabilities to create a digitally stored resulting performance wherein the guest appears as an actor in a short, story-driven video where the combination of wider, establishing shots which compose the participant with actors and other elements in the pre-existing background media are intercut with close-ups of the participant superimposed on appropriate backgrounds to match the backgrounds of the other actors in the pre-existing background media.

The participant position and alignment during the performance is led by "Tally" lights that indicate where the guest should be looking in order to properly align with the characters in the background media. The dialogue for the participant to speak is indicated on traditional teleprompters. These teleprompters also indicate when to speak the dialogue by transforming the text color at the desired time to speak the line along with other directions for the participant to follow to further improve the illusion of the participant interacting with the characters in the background media.

The resulting performance is displayed in real-time on one or more large monitors to be viewed by the surrounding audience and the participants queuing to take their turn performing. The surrounding audience can view both the participant and the monitor(s) whereon the performance is displayed. The performance may be re-played off of the digital storage device for viewing and/or subsequent recording to consumable recording media such as DVD. The digitally stored performance may also be modified and uploaded to a server for subsequent download by the participant via the Internet.

According to one aspect, the invention provides apparatus for creating a story driven video in which images of a live participant are inserted, real time, as an actor in a background video formed by a pre-existing, well known video/story adapted to receive images of the live participant comprising:

a digital library of background media of selectable pre-recorded, well known video media that has been adapted to receive the image of a live participant so as to appear an actor;

operator input means;

means for selecting a background media from the digital library and for playing the background media selected to provide a first signal source for video in response to operator input via the operator input means;

means providing a lighted monochrome background for performance of the live participant;

talent lights for the live participant and means for automatically illuminating the talent lights during the performance to approximate intensity and color temperature of the background media;

a first video camera and a second video camera generating, respectively; a second video signal and a third video signal representing, respectively, images corresponding to different camera shots of a live performance of a participant, means for receiving the first signal of background media from the selection means and for selecting/switching between the second video signal and the third video signal and for providing a real time combination of a selected signal with the first video signal by a chromakey process, resulting in a fourth video signal of composition video;

means for selecting between the first video signal and the fourth video signal to create a fifth video signal of combined video;

and recording the fifth video signal as participant's performance video to a server hard drive as a single file for immediate and future playback and retrieval Preferably, the background media includes audio and the media selection means provides a first signal source for audio, further comprising: means for capturing and recording in real time a voice/sound of the participant and for mixing and combining the real time recording of the voice/sound of the participant with the first signal of background audio to provide a second audio signal; means for disabling the participant's voice/sound by selectively switching between the first and second audio signals to provide a third audio signal of composition audio; and means for combining the fifth video signal and the third audio signal as participant's performance video.

It is also preferred that means are provided for moving respective video cameras to preselected positions, based on a next scene of background media, and based on a height of a participant received by operator input via the operator input means; and, means for changing a zoom, focus and iris of the video cameras to preset positions, based on the next scene of background media, and based on the height of the participant.

More specifically, the invention includes means for retrieving a participant's performance video and modifying format thereof to a consumer broadcast standard format and recording the modified performance video to one of video tape and Digital Video Disk for purchase; and, means for retrieving a participant's performance video and modifying the format and resolution to compressed digital video for internet video streaming, and uploading to a server for later download by the participant via the internet.

According to another aspect, the invention provides a method for creating a story driven video in which images of a live participant are inserted, real time, as an actor in a familiar background video/story comprising the steps of; providing a pre-existing, well known video story; adapting the video story to receive images of the live participant by selecting scenes from the video story, creating an alternative background to provide a place for insertion of another image by creating an image layer using a frame image of a selected scene as a template, creating an opaque area visually matching the background video scenes on a previously transparent background layer on the frame image template to obscure a selected part of the video image; and layering the opaque area with the original video frame to provide a back ground video; saving and inserting the frames into a remainder of the original video; preparing a synchronized script; providing the script to the participant and taking selected shots of the participant performing the script with a video camera and inserting the shots in respective selected frames of the back ground video to provide a participants performance video.

A series of different background media are made and stored for access on demand in a digital library.

This brief summary is provided so that the nature of the invention may be understood. In addition, a specific example of the invention is described in significantly more detail in the following Description of the Preferred Embodiment in conjunction with the accompanying drawings, which, together, form a complete description.

BRIEF DESCRIPTION OF THE DRAWINGS

FIG. 7 shows a parts list of the components of the preferred embodiment. wherein product ID numbers correspond to those in FIGS. 1,2 & 3.

DETAILED DESCRIPTION OF THE PREFERRED EMBODIMENT

Figure 1A:
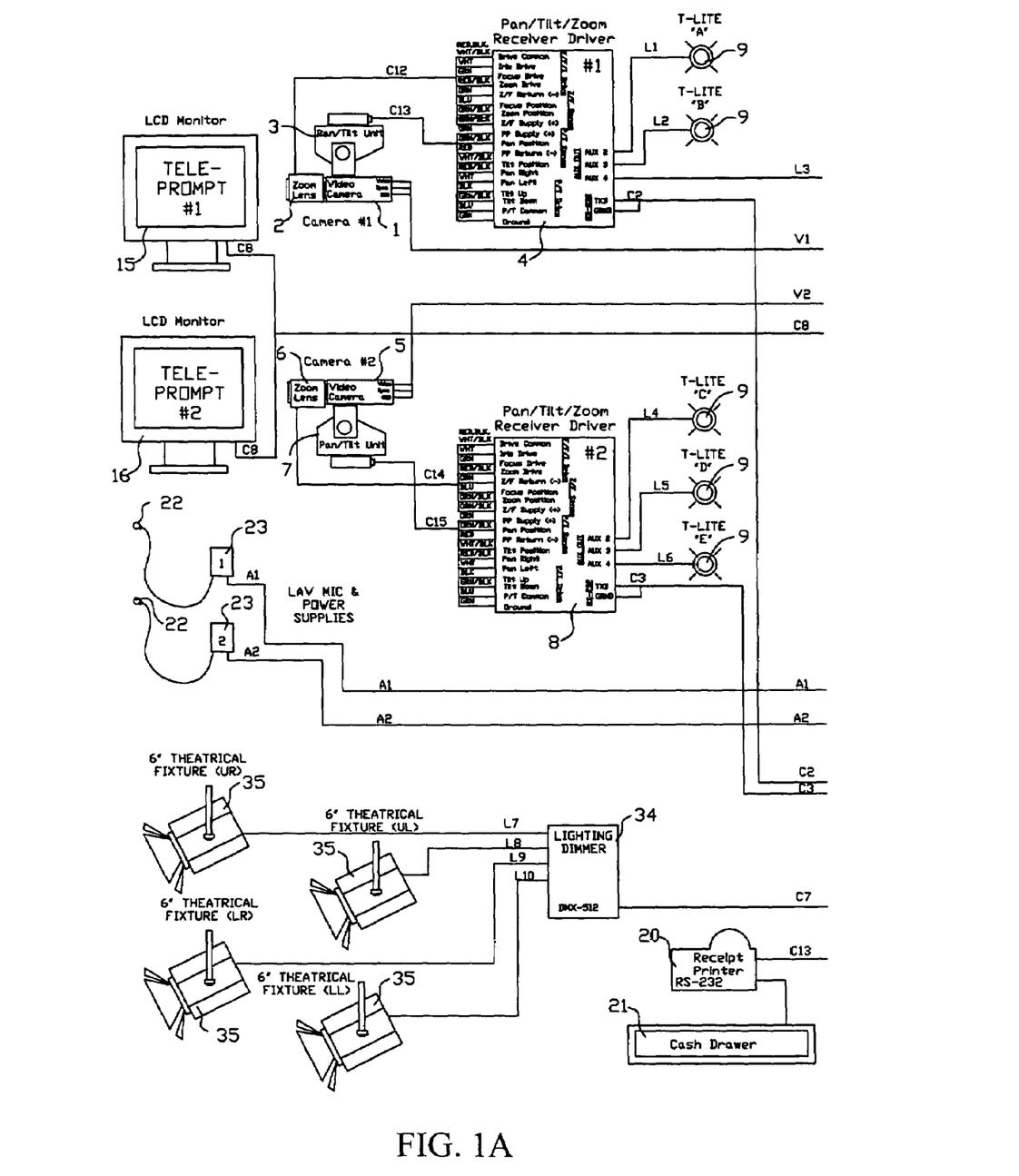
FIG. 1A and FIG. 1B, when combined, represent a schematic block diagram of one embodiment of the invention showing the main electronic and electrical "active" components and their relation to each other. Power to the components other than Show Controlled Lighting is not shown.
Figure 1B:
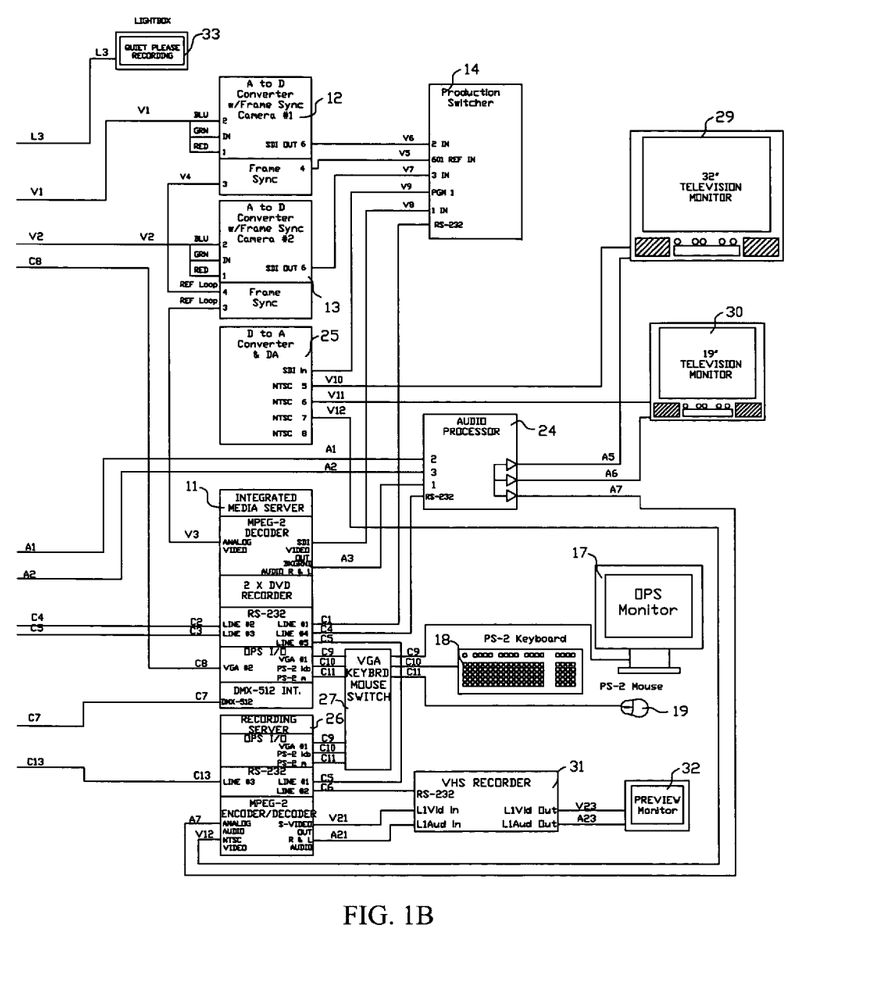

FIGS. 1A and 1B are schematic block diagrams showing the video, audio and control interconnections of active components of the invention.

A first camera 1 has associated with it a zoom lens 2, a pan-tilt unit 3 with receiver/driver 4, (with motion and zoom lens control such as that described in U.S. Pat. No. 5,517,236 issued May 14, 1996 to Sergeant et al.) and analog to digital (A to D) converter with frame sync 12. This camera generates a video composite signal and red, green and blue video signals of the participant's performance for input to the A to D Converter. This camera also takes a composite signal as reference as input to the frame sync module located in the A to D converter 12. This signal is from video decoder located in the integrated media server 11, (manufactured by Granite Precision, Pine Mountain, Calif.).

A second camera 5 has associated with it a zoom lens 6, a pan-tilt unit 7 with receiver/driver 8, and analog to digital (A to D) converter with frame sync 13. This camera generates a video composite signal and red, green and blue video signals of the participant's performance for input to the A to D converters 3. This camera also takes a composite signal as reference as input to the frame sync module located in the A to D converter 13. This signal is from video decoder located in the integrated media server 11.

If more than two cameras angles are required in another embodiment of the invention, the arrangement of the components described for the first and second cameras would be repeated for subsequent cameras. This would enable additional angles of video capture of the participants performance.

The production switcher 14, (manufactured by Ross Video, Toronto, Canada) receives the background video as a serial digital signal from the Integrated media server 11. The background video signal is used as fill in a digital chroma key process, (such as those described in U.S. Pat. No. 5,249,039 issued Sep. 28, 1993 to Chaplin, and in U.S. Pat. No. 5,305,107 issued Apr. 19, 1994 to Gale et al.), where the monochrome background from the cameras 1, 5 is replaced with this background image. The production switcher 14 switches the background signal to the output when only background video is desired. Alternatively, the production switcher 14 is able to switch to any one of the composite signals created by the chroma key process described above. In this embodiment, there are two composite signals to choose from. The first of these composite signals is the video signal from camera 1 as the foreground and the background video signal from the integrated media server 11. The second of these composite signals is the video signal from camera 5 as the foreground and the background video signal from the integrated media server 11. The production switcher 14 is also able to add other video effects to enhance the output video signal. These include, but are not limited to mattes, dissolves and fades. The production switcher 14 in this preferred embodiment is controlled via serial RS-232 control from the integrated media server 11.

The serial digital output signal from the production switcher 14 is routed to a digital to analog converter (D to A) 25. This device converts the signal back to an analog NTSC video signal, and also distributes the signal to other devices. The devices the analog signal is routed to include the audience view monitor 29, the participant view monitor 30 and a video encoder/decoder located in the recording server 26, (such as those described in U.S. Pat. No. 5,175,618 issued Dec. 29, 1992 to Ueda et al. and U.S. Pat. No. 5,093,720 issued Mar. 3, 1992 to Krause et al.). In this embodiment, the encoder in the recording server 26 encodes the analog NTSC video signal to MPEG 2 format and stores the performance as a video file in the performance media library of the recording server 26 hard drive for later use. There is a KVM switch that enables a keyboard 18, mouse 19 and monitor 17 to be shared between the integrated media server 11 and the recording server 26.

Audio for the participant's performance is captured using a wired lav ("lavaliere") microphone 22 and power supply 23. In this embodiment, there are two lav microphones 22 and two power supplies 23. This enables multiple participants to perform simultaneously. An audio processor 24 combines the participants' voice audio signal with the background audio from the integrated media server 11 in the audio processor 24. The audio processor 24 also performs other functions such as audio switching, equalization and delay, (with audio incorporation such as that described in U.S. Pat. No. 5,848,146 issued Dec. 8, 1998 to Slattery). The audio signal is routed from the audio processor 24, to an audience view monitor 29, a participant view monitor 30 and to the video encoder/decoder located in the recording server 26. In this embodiment, the video encoder/decoder in the recording server 26 encodes the stereo audio and analog NTSC video signal to MPEG 2 format and stores the performance as a video file in the performance media library of the recording server 26 for later use.

The recording server 26 can output the video and combined audio from a previously recorded performance. The video signal is decoded and distributed to a VHS recorder 31. The performance video can be monitored by the operator during recording by viewing a preview monitor 32. The recording server 26 communicates device control to the video recorder 31 via a Serial RS-232. The performance video can also be authored/edited and burned to a DVD automatically utilizing DVD authoring and burning software and hardware provided in the recording server 26 for such task.

The timing and automation of the devices to sync with the background media is all pre-programmed in the show control software of the integrated media server 11. The participant is cued to speak lines and given directions for actions by two teleprompters 15, 16 consisting of LCD screens viewed through semi-reflective glass in front of each camera 1 and 5, respectively. Multiple tally lights 9 instruct the participant where to look during the performance to align properly with characters and elements in the background media. The timing of these tally lights is communicated through Serial RS-232 from the integrated media server 11 to the pan/tilt receiver/driver units 4, 8. The tally lights 9 are auxiliary outputs of the receiver/driver units 4, 8. An additional auxiliary output of receiver/driver unit 4 lights the "Quiet Please, Recording" light box 33.

Four talent lights 35 are automated during the performance to match, approximately, the lighting on the foreground participant with lighting in the original background media. The lights are cued by the integrated media server 11 which communicates via DMX 512 to the lighting dimmer 34, (such as that described in U.S. Pat. No. 4,095,139 issued Jun. 13, 1978 to Symounds et al.)

The selection of the background media, and its associated device control, is initiated by an operator. The operator communicates to the integrated media server 11 using the (conventional) computer keyboard 18, mouse 19 and monitor 17. The process is automated with operator prompts on monitor 17. The point of sale functions for VHS tape and DVD sales are also automated by the recording server 26 which communicates serially with, and controls, a receipt printer 20 and cash drawer 21, via a RS-232.

Figure 2:
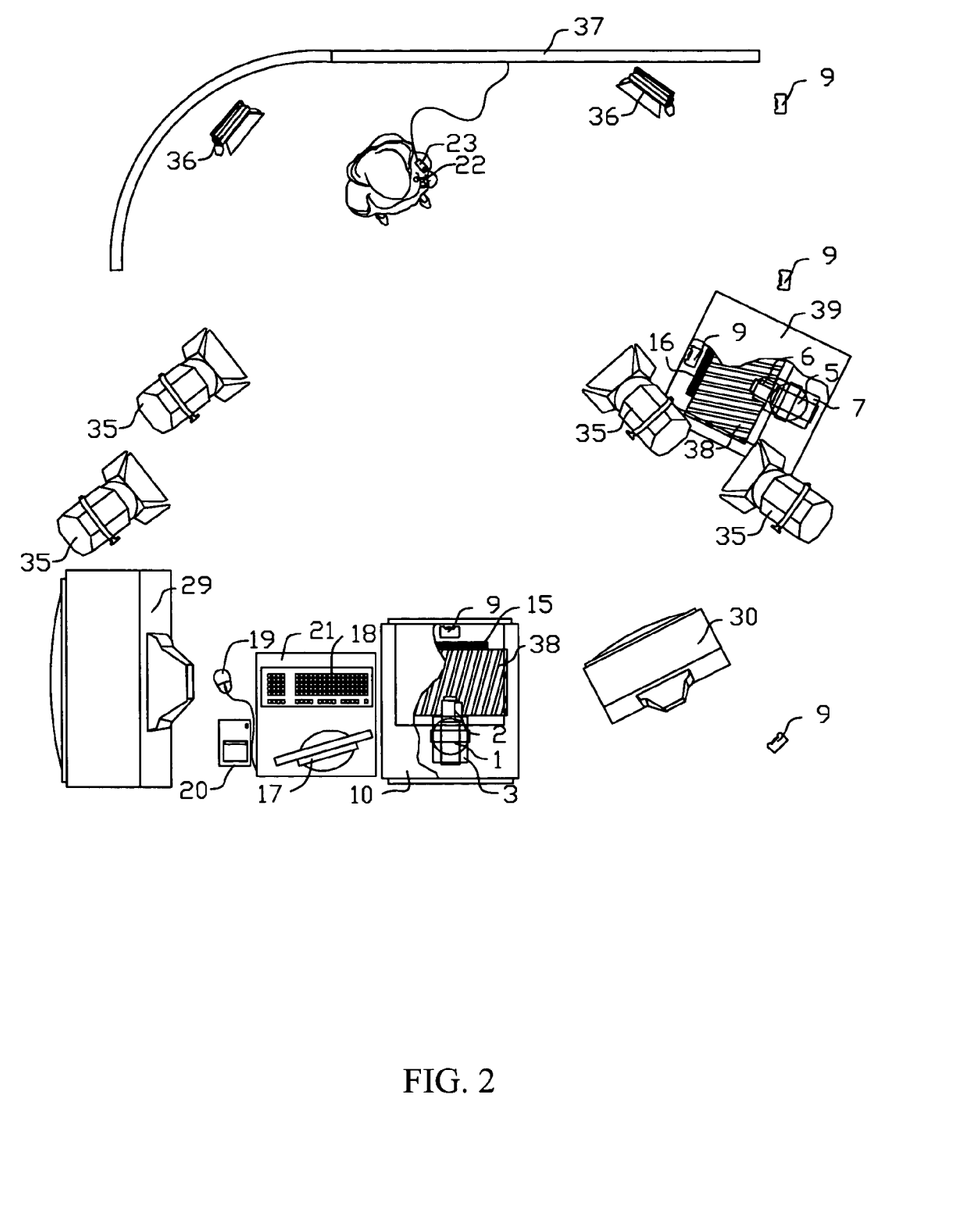
FIG. 2 is a plan view of the major components of one embodiment of the invention. The structures for this embodiment and the monochrome backdrop illumination have been removed for clarity. The enclosures for camera 1 and camera 2 are cut-away to expose these elements.

In FIG. 2, a participant is shown in the approximate performance position, situated in front of an illuminated monochrome screen 37. The participant is illuminated by talent lights 35, 36. The tally lights 9 are distributed around the perimeter right side and bottom.

The lav microphone 22 and power supply 23 for the performance audio are attached to the participant. The signal cable is routed to other audio components housed in the electronics enclosure 10 as shown in FIGS. 1A and 1B.

The audience view monitor 29 is located on the lower left, and for display to an audience situated to the left in plan view. The participant view television monitor 30 is located directly in front of the participant.

The operator control and point of sale items located to the left of the main electronics enclosure 109 include the keyboard 18, mouse 19, monitor 17, receipt printer 20 and cash drawer 21. These route directly to the integrated media server 11, not shown, which is located in electronic enclosure 10.

Electronic enclosure 10 is cut away to show the video camera 1, zoom lens 2, pan/tilt unit 3, the teleprompter monitor 15 the teleprompter glass 38 and one of the tally lights 9. Other components located in electronic enclosure 10 but not shown in this view include: pan/tilt receiver-driver 4, video A to D converters 12, 13, production switcher 14, integrated media server 11, audio processor 24, video D to A converter 25, recording server 26, VHS recorder 31, and lighting dimmer 34.

Electronic enclosure 39 is cut away to show the video camera 5, zoom lens 6, pan/tilt unit 7, the teleprompter monitor 16 the teleprompter glass 38 and one of the tally lights 9. Other components located in electronic enclosure 39 but not shown in this view include the pan/tilt receiver-driver 8.

Figure 3:
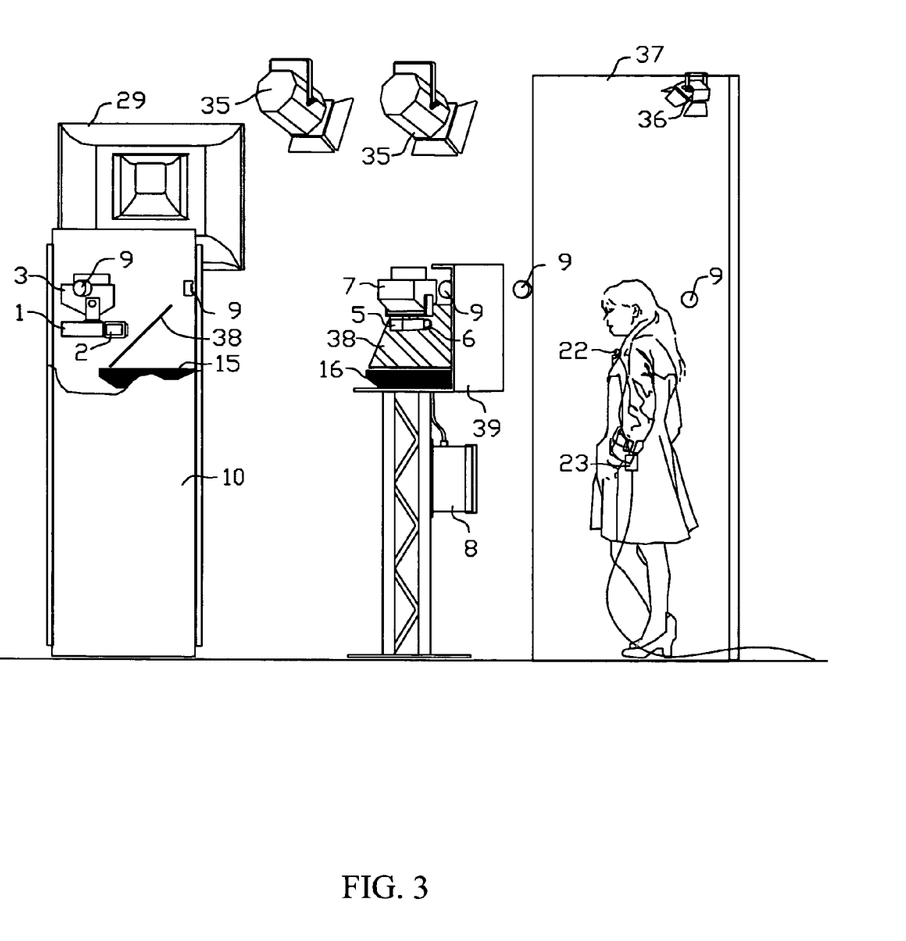
FIG. 3 is a right elevation view of the major components of one embodiment of the invention. The structures for this embodiment and the monochrome backdrop illumination have been removed for clarity. Also the participant's view television monitor is removed for clarity. The enclosures for camera 1 and camera 2 are cut-away to expose these elements.

In FIG. 3, a participant is shown in the approximate performance position, situated in front of an illuminated monochrome screen 37. The participant is illuminated by talent lights 35,36. Tally lights 9 are distributed at approximate eye level.

The lav microphone 22 and power supply 23 for the performance audio is shown attached to the participant. The cabling for this device is not shown, but is routed to other audio components in the electronics enclosure 10, as indicated in FIGS. 1A and 1B

The audience view monitor 29 is located on the upper left behind the electronic enclosure 10. The participant view television monitor 30 has been omitted to better show other items in the electronic enclosure 10.

The operator control and point of sale items are not shown in this view but are located behind the main electronics enclosure 10. These include the keyboard 18, mouse 19, monitor 17, receipt printer 20 and cash drawer 21.

Electronic enclosure 10 is cut away to show the video camera 1, zoom lens 2, pan/tilt unit 3, the teleprompter monitor 15 the teleprompter glass 42 and one of the tally lights 9. Other components located in electronic enclosure 10 but not shown in this view include: pan/tilt receiver-driver 4, video A to D converters 12, 13, production switcher 14, integrated media server 11, audio processor 24, video D to A converter 25, recording server 26, VHS recorder 31, and the lighting dimmer 34.

Electronic enclosure 39 is cut away to show the video camera 5, zoom lens 6, pan/tilt unit 7, the teleprompter monitor 16 the teleprompter glass 38 and one of the tally lights 9. Also shown here is the pan/tilt receiver-driver 8 attached to the structure for electronic enclosure 39.

A description of the methods used to create the background media follows:

Recognizable, well-known media such as a movie or television show is converted to video format (if not already in that format). With the final integration of a participant actor in mind, the video is edited to a shorter, story-driven series of video segments using a computer-based video editing system such as Final Cut Pro from Apple Computer, Inc. or the Avid editing system from Avid Technology, Inc. The result is media prepared for incorporation of video and audio of the participant and a position is made for the insertion by the chromakey process.

Figure 4:
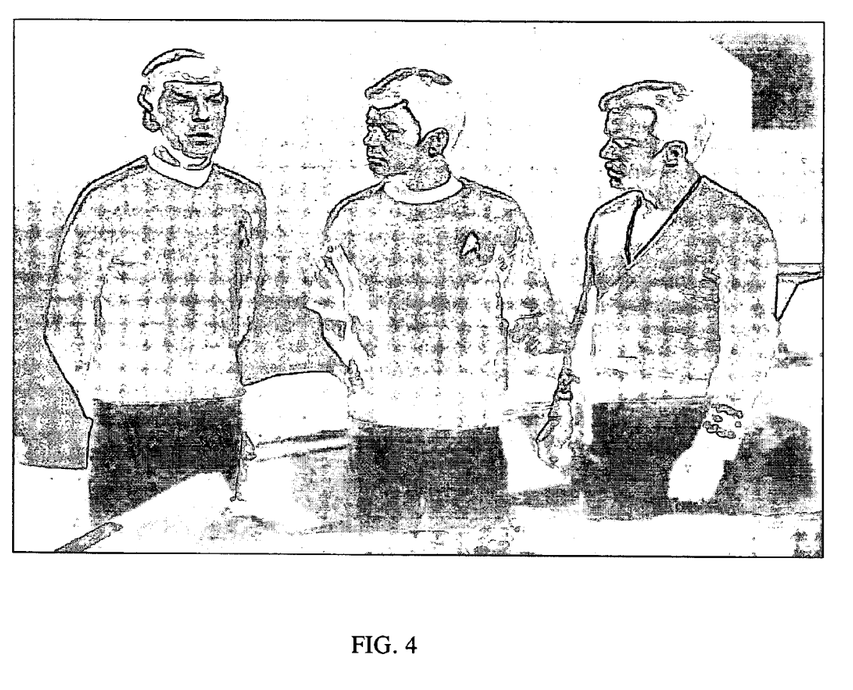
FIG. 4 shows a frame of a representative scene of video as it appears in the original recognizable video and audio presentation.

Once the video is edited, the scenes in which the participant will perform are selected and a representative frame of video from each scene is captured and converted and exported as an image format such as JPEG. This process is accomplished using the editing software described above. One image per scene is selected to act as a template for the next step. FIG. 4 is a representation of this step of the method.

Figure 5:
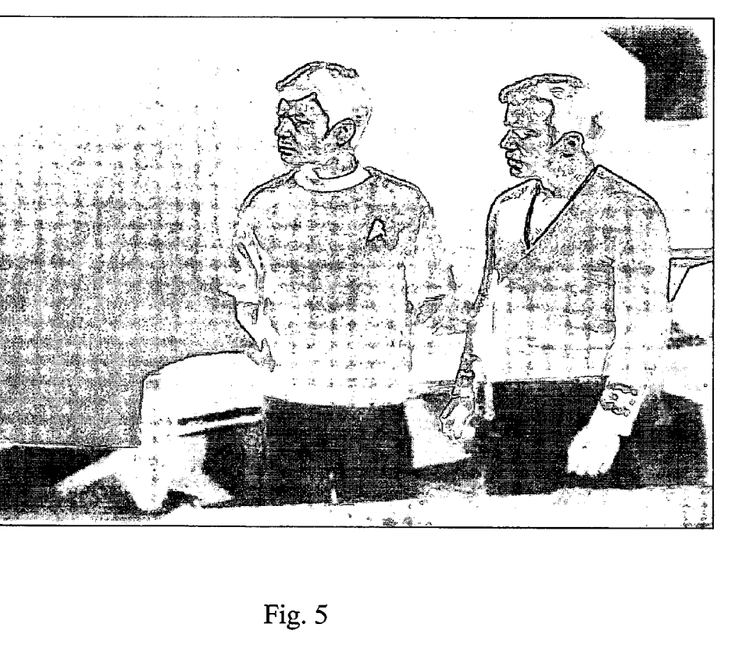
FIG. 5 shows a frame of a representative scene of video as it appears after digital modification. The modification removes a character or other background elements to allow for the insertion of the participant(s) into a scene in the recognizable video and audio presentation.

Each image selected is then altered using a photo editing system such as Photoshop from Adobe Systems, Inc. In the alteration process an alternate background is created to provide a place for the future insertion of the (image of) the participant actor by the system devices of the invention described previously. In the photo editing software a image layer is created using the original video frame image as a template. An opaque area is created on a normally transparent background layer to cover over part of the video image. This opaque area is artistically edited to match the video colors, quality and character. When layered with the original video frame, a place is created for the future integration of the participant actor as represented in FIG. 5. Note that several of these frames can be made for use in the video editing system if animation of the background is desired.

These images are then saved in an appropriate resolution (720×480 in this embodiment) as an image file, such as JPEG to be imported to the video editing system. Once the frames are imported, they are then inserted into the video timeline at the appropriate position as a layer of video on top of the original video sequence. This results in a video sequence ready for integration of the participant actor as in FIG. 5.

The audio is then edited to accommodate the participant actor's spoken lines and, optionally, audio sweetening, music or other audio manipulations are performed in a studio or with other audio editing software, to create audio that is similar in character, volume and background score to the original yet still allow for incorporation of the participant actor's voice.

Figure 6:
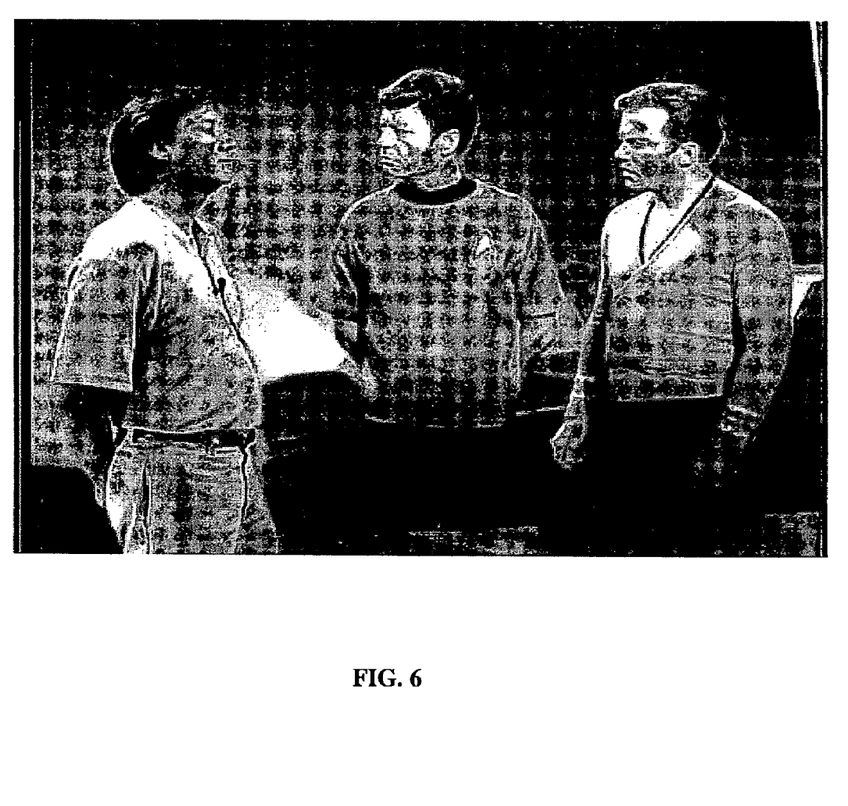
FIG. 6 shows a frame of a representative scene of video as the participant appears inserted into the scene of recognizable video and audio presentation.

On completion of the video and audio, the entire sequence is then exported/converted in a compressed video format such as MPEG2. This background media file is then incorporated into the video background media library of the integrated media server 11 for later use. The system then integrates the participant actor with the background in the appropriate locations, as represented by FIG. 6.

Figure 8:
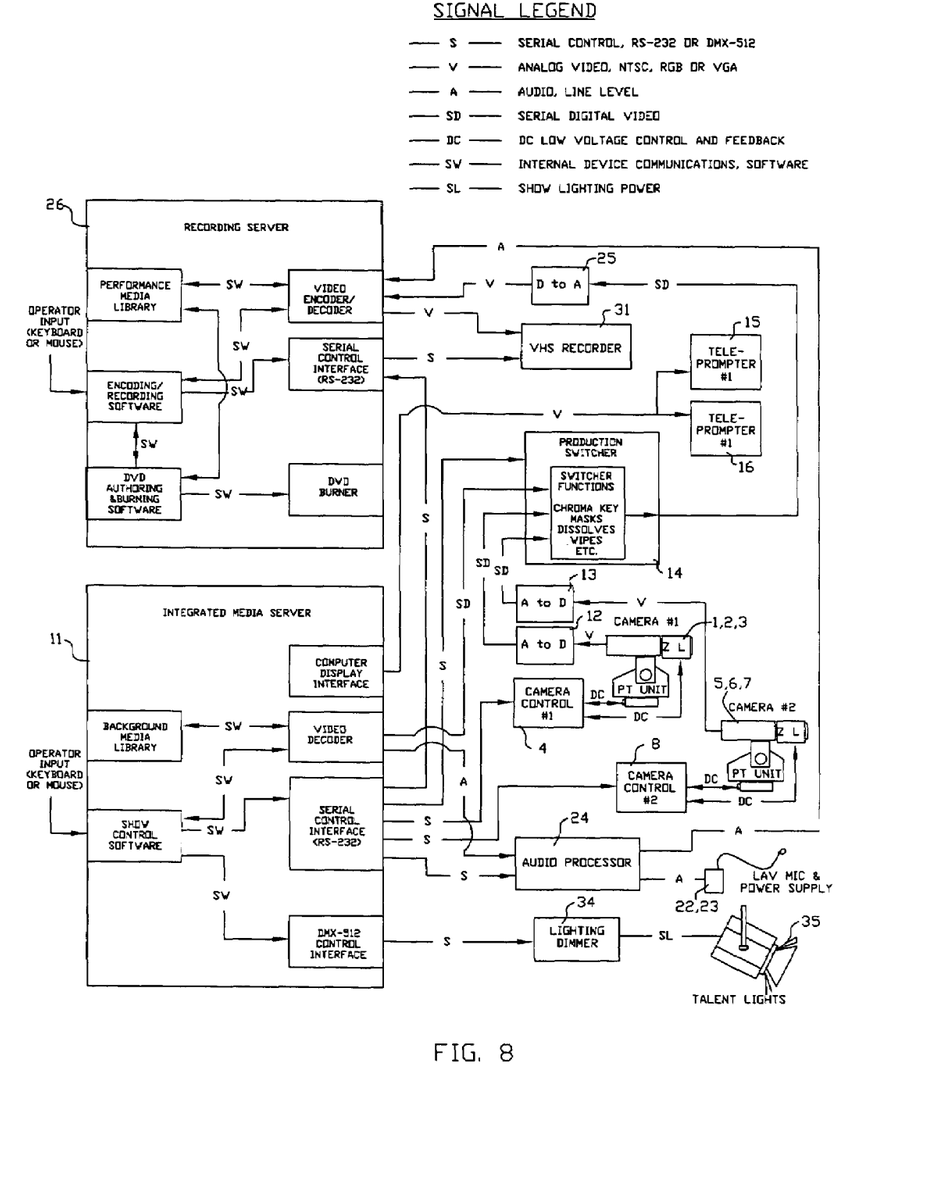
FIG. 8 is a signal flow diagram.

A description of the signal flow follows, with reference to FIG. 8.

Operator input to show control software in the integrated media server 11 first sets variables that automate the devices in the system. The variables that are initially set are; the episode that will be displayed (background media and show control sequence), the height of the individual (chosen from five height ranges) and the name of the participant (for use in identifying the individuals file later in the recording server 26).

Setting the episode variable causes the show control software to initiates the video sequence by directing the video decoder to locate and buffer the appropriate video file from the background media library. Once buffered, the video file is started by the show control software. Further, the episode variable setting selects in the show control software the show sequence that will be run. On setting this variable the show control software initiates control of the devices of the system, and sets them to their initial position settings through the serial control interface (RS-232) and the DMX-512 control interface. The devices that are initialized are the production switcher 14, the camera control units 4 & 8, the audio processor 24 and the lighting dimmer 34.

The participant's height variable further modifies the show control software setting select commands sent to the camera control modules once the show is started, to select from a different set of presets in the camera control units 4 & 8 which conform to the height range of the participant and a particular scene of the background media file.

The variable for the name of the participant is used by the show control software to initialize the recording server 26 from the serial control interface of the integrated media server 11 and to the recording server 26. Furthermore, the software provides packet information used by the recording server 26 to name the video file that will be created, (which name is derived from the participant initials, the time and the date of the performance). In this process, the recording server 26 communicates internally using the encoding/recording software to the video encoder/decoder to encode an incoming signal to a compressed video file (MPEG-2), and to save this file in a specified folder in the performance media library. Also the encoding/recording software communicates a time in seconds that the video encoder/decoder will encode the video stream. The actual encoding process starts once the show sequence is started. This is a command from the integrated media server 11 via the same serial control interfaces mentioned earlier.

Operator input to the integrated media server 11 causes it to start the selected show sequence. The show control software commands the video decoder to start the preselected video sequence. On show sequence start, the system devices change, if necessary, to accommodate the height of the individual for the first scene. The changes are communicated from the integrated media server 11 to the camera control units 4 & 8. Also on start, the integrated media server 11 communicates to the recording server 26 to start the encoding process referred to earlier.

Once the show has started the integrated media server 11 updates and changes the communications to the system devices based on show control software settings in the integrated media server 11 and based on presets in the system devices. The system devices that are continuously controlled during the performance are the production switcher 14, the camera control units 4 & 8, the audio processor 24 and the lighting dimmer 34. All the communications are from the serial interface of the integrated media server 11 to the serial input of the device except the lighting dimmer 34. The lighting dimmer 34 receives a signal from the DMX-512 control interface of the integrated media server.

While the show sequence is running the show control software sends teleprompter text to the computer display of the integrated media server 11. The computer display interface (video graphic card) is set to two monitors side by side at 1120×768 resolution. One of the two monitors is used as the operators GUI of the integrated media server 11, while the other monitor receives the teleprompter text that is displayed in a backwards font. This backward text signal is split and sent to two LCD monitors that are viewed reflected from a partially reflective glass surface. These are the teleprompters 15 & 16. The show control software in the integrated media server 11 displays the teleprompter text in "white" and the changes the color to "green" at the appropriate moment for the participant to speak the dialog. Acting instructions are displayed in "red".

The cameras 1 & 5 signals are analog RGB signals routed to analog to digital (A to D) converters 12 & 13. These A to D converters have a frame sync module to allows the cameras to sync to a remote sync signal based on the "green" signal of the respective camera. For clarity the sync signals are not shown in FIG. 8. The A to D converters 12 & 13 convert the signal to serial digital video which are routed to the production switcher 14.

The production switcher 14 receives serial digital video signals from the integrated media server 11 (the background media) and from each of the cameras 1 & 5 (participant in front of a monochromatic background). The production switcher 14 processes the serial digital video signal in response to commands from the show control software of the integrated media server 11 via the serial control interface. A typical command set will first set the production switcher to a set of preset functions such as chroma key, mask, dissolve, cut etc. Each of the functions can be in the on or off state (routed to the output of the production switcher, or not) depending on what is required for the show sequence. The next command will take any one or any number of these functions to the opposite state. For example the participant can be cut into the background (chroma key+cut) in a single frame of video, or dissolved-in (chroma key+dissolve) over a number of seconds. The next command might set up the next scene, and so on.

The audio processor 24 receives a background media audio signal from the video decoder on the integrated media server 11. It also receives audio signals from one or more lav microphones and power supplies 22 & 23. Show control software in the integrated media server 11 commands the audio processor 24, via the serial control interface (RS-232), to presets during the show sequence. Each preset has internal settings for routing, equalization and delay. In this way the participants voice can be muted during non-dialog moments.

The lighting dimmer 34 receives DMX-512 serial signals during the show sequence. Unlike the other show system devices, the lighting dimmer 34 does not use presets, but instead changes the intensity of each light 35 independently, based on the DMX-512 protocol. The lights 35 are illuminated individually or in groups to illuminate the participant in a way that approximates the lighting of the background media and actors.

Immediately before ending the show sequence, the show control software in the integrated media server 11 communicates with all system devices and returns them to an initial setting.

When the show sequence has finished the recording, server 26 has a compressed video file (MPEG-2) of the participant's performance in the appropriate folder of the performance media library. The GUI interface of the encoding/recording software permits the operator to select the participant's performance video file, and record it to VHS tape or to burn it to a DVD.

If the participant chooses to have the performance recorded to VHS tape, the operator will select the file and select the "record to VHS" option in the GUI of the recording server 26 encoding/recording software. When this is selected the encoding/recording software communicates to the video encoder/decoder to decode a video file and directs it to the specified location in the performance media library of the participant's performance video file. Further it communicates a time in seconds to continue the video decoding process. Simultaneously, the encoding/recording software in the recording server 26 communicates to the VHS recorder 31 through the serial control interface (RS-232). The VHS recorder 31 is initialized and is queried if a VHS tape is installed. If not the encoding/recording software in the recording server 26 will recognize this, and instruct the operator to install a tape. Once the tape is installed the operator can start the recording sequence using the GUI of the encoding/recording software of the recording server 26 to command the VHS recorder 31 to start recording while it commands the video encoder/decoder of the recording server 26 to decode the selected video. Once the video has been recorded the encoder/recorder software commands the video encoder/decoder to stop decoding the video file. It further commands the VHS recorder 31 to stop recording and to eject the tape.

If the participant chooses to have the performance on a DVD, the operator will select the file and select the "burn to DVD" option in the GUI of the recording server 26 encoding/recording software. When this is selected the encoding/recording software communicates to the DVD authoring & burning software in the recording server 26, to author a video file and directs it to the specified location in the performance media library of the participant's performance video file. The DVD authoring and burning software will author the compressed video file to DVD compatible files, as well as add a main menu and appropriate images (from the DVD authoring & burning software). The DVD authoring & burning software will then communicate with the DVD burner in the recording server 26 to burn the DVD. The encoding/recording software continuously gets progress status from the DVD authoring & burning software and displays this on the GUI. Once the DVD burning process is complete the DVD disk is ejected and the encoding/recording software returns to a state ready for the next participants video file to be recorded to VHS tape or burned to DVD.

A brief synopsis of the participant's experience follows:

When the participant agrees to perform, the operator first obtains information from the participant including name, height, episode (background media) in which to star, and possibly e-mail address. From this information the participant is instructed where to stand by the operator and where to look during the performance. This instruction includes which tally lights will be operational and when to look at them. It also includes information coming to the participant from the teleprompters such as lines, when to say them, and timely acting instructions.

Once the participant is ready the performance begins and the process is automated. The lines on the teleprompter appear in sync with the background media. The tally lights illuminate to cue the participant where to look at the appropriate time. The camera position, as well as zoom and focus are adjusted automatically to match the scene of background media and the height of the participant. In addition talent lights are illuminated at the appropriate time to approximate the lighting on the participant to that of the background media.

While the participant is performing, the production switcher automatically switches, at pre-determined intervals, between the background only scene signal and that of the composite scene of first camera plus background or the second camera plus background. More cameras can be used if required, resulting in additional video signals from which to choose.

During performance, the video signal output of the performance is being encoded to a digital computer file by the video encoder/decoder in the recording server. This digital file is cataloged and stored as an MPEG2 video file on an internal hard drive of the recording server.

On finishing the live performance, the participant is invited by the operator to purchase a video copy of the performance as a VHS tape, or a DVD with a choice of NTSC, PAL, SECAM or other consumer broadcast standard format. Once the selection is made, the integrated media server automates the task of decoding the digital video file and recording this to VHS tape, if chosen. If the participant chooses a DVD the integrated media server authors the digital video file to record to DVD, and then records the DVD via an internal DVD recording drive.

The participant may further choose to have the digital video file uploaded to a server for later retrieval via the internet for which the operator selects a function in the integrated media server to create a lower resolution version of the file, transfers the file to another computer via hard drive, disk or TCPIP, from any of which the file is later uploaded to a server for later retrieval.

All of the automated tasks are controlled by the integrated media server at pre-determined intervals that match that of the action in the background media, the height of the participant and the selection made concerning purchase of the video. These controls are in the form of Serial RS232 controls to (and from) the production switcher, the camera receiver/drivers, the VHS recorder and the receipt printer and cash drawer. All of these devices are controlled via RS232 protocols provided by the manufacturers of the devices. Controls for the talent lights and the audio router are in the form of digital I/O or DMX512.

The software controlling the integrated media server is customized to control the components of the participatory entertainment product.

The invention claimed is:

1. Apparatus for creating a story driven video in which images of a live participant are inserted, real time, as an actor in a background video formed by a pre-existing, well known video/story adapted to receive images of the live participant comprising:

a digital library of background media of selectable pre-recorded, well known video media that has been adapted to receive the image of a live participant so as to appear an actor;

operator input means;

means for selecting a background media from the digital library and for playing the background media selected to provide a first signal source for video in response to operator input via the operator input means;

means providing a lighted monochrome background for performance of the live participant;

talent lights for the live participant and means for automatically illuminating the talent lights during the performance to approximate intensity and color temperature of the background media;

a first video camera and a second video camera generating, respectively; a second video signal and a third video signal representing, respectively, images corresponding to different camera shots of a live performance of a participant, means for receiving the first signal of background media from the selection means and for selecting/switching between the second video signal and the third video signal and for providing a real time combination of a selected signal with the first video signal by a chromakey process, resulting in a fourth video signal of composition video;

means for selecting between the first video signal and the fourth video signal to create a fifth video signal of combined video;

and recording the fifth video signal as participant's performance video to a server hard drive as a single file for immediate and future playback and retrieval.

2. Apparatus according to claim 1 wherein the background media includes audio and the media selection means provides a first signal source for audio, further comprising:

means for capturing and recording in real time a voice/sound of the participant and for mixing and combining the real time recording of the voice/sound of the participant with the first signal of background audio to provide a second audio signal;

means for disabling the participant's voice/sound by selectively switching between the first and second audio signals to provide a third audio signal of composition audio; and means for combining the fifth video signal and the third audio signal as participant's performance video.

3. Apparatus according to claim 2 comprising;
means for moving respective video cameras to preselected positions, based on a next scene of background media, and based on a height of a participant received by operator input via the operator input means;
means for changing a zoom, focus and iris of the video cameras to preset positions, based on the next scene of background media, and based on the height of the participant.

4. Apparatus according to claim 3 comprising;
means for retrieving a participant's performance video and modifying format thereof to a consumer broadcast standard format and recording the modified performance video to one of video tape and Digital Video Disk for purchase; and,
means for retrieving a participant's performance video and modifying the format and resolution to compressed digital video for internet video streaming, and uploading to a server for later download by the participant via the internet.

5. A method for creating a story driven video in which images of a live participant are inserted, real time, as an actor in a familiar background video story comprising the steps of:
providing a pre-existing, well known video story;
adapting the video story to receive images of the live participant by selecting scenes from the video story, creating an alternative background to provide a place for insertion of another image by creating an image layer using a frame image of a selected scene as a template, creating an opaque area visually matching the background video scenes on a previously transparent background layer on the frame image template to obscure a selected part of the video image;
and layering the opaque area with the original video frame to provide a back ground video;
saving and inserting the frames into a remainder of the original video;
preparing a synchronized script;
providing the script to the participant and taking selected shots with at least one video camera of the participant performing the script with a video camera and inserting the shots in respective selected frames of the background video to provide a participant's performance video.

6. A method according to claim 5 including the step of making a plurality of different background media and storing the background media in a digital library.

7. Apparatus for creating a story driven video in which images of a live participant are inserted, real time, as an actor in a background video formed by a pre-existing, well known video/story adapted to receive images of the live participant comprising:
a digital library of background media of selectable pre-recorded, well known video media that has been adapted to receive the image of a live participant so as to appear an actor;
operator input means;
means for selecting a background media from the digital library and for playing the background media selected to provide a first signal source for video in response to operator input via the operator input means;
means providing a lighted monochrome background for performance of the live participant;
talent lights for the live participant and means for automatically illuminating the talent lights during the performance to approximate intensity and color temperature of the background media;
a first video camera and a second video camera generating, respectively; a second video signal and a third video signal representing, respectively, images corresponding to different camera shots of a live performance of a participant,
means for receiving the first signal of background media from the selection means and for selecting/switching between the second video signal and the third video signal and for providing a real time combination of a selected signal with the first video signal by a chromakey process, resulting in a fourth video signal of composition video;
and recording the fourth video signal as participant's performance video to a server hard drive as a single file for immediate and future playback and retrieval.

* * * * *